US011667093B2

(12) United States Patent
Ingman (10) Patent No.: US 11,667,093 B2
(45) Date of Patent: Jun. 6, 2023

(54) METHOD FOR MANUFACTURING ONE-PIECE CORRECTIVE EYEWEAR (71) Applicant: Asimos OY, Helsinki (FI)

(72) Inventor: Henri Ingman, Helsinki (FI)

(73) Assignee: Asimos OY, Helsinki, FL (US)

( * ) Notice: Subject to any disclaimer, the term of this patent is extended or adjusted under 35 U.S.C. 154(b) by 63 days.

(21) Appl. No.: 17/042,285

(22) PCT Filed: Mar. 28, 2019

(86) PCT No.: PCT/EP2019/057968
§ 371 (c)(1),
(2) Date: Sep. 28, 2020

(87) PCT Pub. No.: WO2019/185856
PCT Pub. Date: Oct. 3, 2019

(65) Prior Publication Data
US 2021/0370626 A1 Dec. 2, 2021

(30) Foreign Application Priority Data

Mar. 29, 2018 (DE) .......................... 102018107683.5

(51) Int. Cl.
*B29D 12/02* (2006.01)
*G02C 5/22* (2006.01)
(Continued)

(52) U.S. Cl.
CPC ........ *B29D 12/02* (2013.01); *B29D 11/00865* (2013.01); *B29D 11/00894* (2013.01);
(Continued)

(58) Field of Classification Search
CPC ........ B29D 11/00865; B29D 11/00923; B29D 11/00894; B29D 12/02; B33Y 10/00; B33Y 80/00; G02C 5/22; G02C 13/001
See application file for complete search history.

(56) References Cited

U.S. PATENT DOCUMENTS

| 2015/0055085 A1 | 2/2015 | Fonte et al. |
| 2015/0127132 A1 | 5/2015 | Nyong'o et al. |

(Continued)

FOREIGN PATENT DOCUMENTS

| DE | 102009004380 A1 | 7/2010 |
| EP | 2980629 * | 2/2016 |

(Continued)

OTHER PUBLICATIONS

International Search Report and Written Opinion for International Application PCT/EP2019/057968, dated Aug. 29, 2019.

*Primary Examiner* — Mathieu D Vargot
(74) *Attorney, Agent, or Firm* — The Dobrusin Law Firm, P.C.

(57) ABSTRACT

A method for manufacturing one-piece corrective eyewear. The method includes a first step wherein an item with essentially flat blank shape is formed by a 3D-printing process. The item encompasses two lens portions, a bridge portion, and two temple portions; or the two lens portions and the bridge portion. The method includes a second step wherein the item is deformed into a wearable shape. During the first step a frame portion surrounding the lens portions is formed as part of the blank shape.

10 Claims, 5 Drawing Sheets (51) Int. Cl.
  *G02C 13/00*   (2006.01)
  *B29D 11/00*   (2006.01)
  *B33Y 10/00*   (2015.01)
  *B33Y 80/00*   (2015.01)
  *B29L 12/00*   (2006.01)

(52) U.S. Cl.
  CPC ......... *B29D 11/00923* (2013.01); *G02C 5/22* (2013.01); *G02C 13/001* (2013.01); *B29L 2012/005* (2013.01); *B33Y 10/00* (2014.12); *B33Y 80/00* (2014.12)

(56) References Cited

U.S. PATENT DOCUMENTS

| | | |
|---|---|---|
| 2015/0277155 A1 | 10/2015 | Raviv |
| 2016/0266401 A1 | 9/2016 | Wong |
| 2017/0017094 A1 | 1/2017 | James |
| 2019/0146242 A1* | 5/2019 | Mappes ........... B29D 11/00028 351/159.48 |
| 2020/0331219 A1* | 10/2020 | Van Heugten ........ B29C 64/112 |

FOREIGN PATENT DOCUMENTS

| | | |
|---|---|---|
| EP | 3135464 A1 | 3/2017 |
| WO | 2016/049226 A1 | 3/2016 |

\* cited by examiner

METHOD FOR MANUFACTURING ONE-PIECE CORRECTIVE EYEWEAR

FIELD

The present teachings relate to eyewear, use of eyewear, and to a method for manufacturing one-piece corrective eyewear.

BACKGROUND

Conventional methods for producing eyewear usually consist of manufacturing lenses and frame parts separately and then assembling the different components into a wearable object. This approach is mainly dictated by the stringent requirements regarding material quality of the lenses and the accuracy of their shapes. Technical advances relating to both aspects have opened up possibilities for new approaches. Transparent synthetic materials with high optical index allow a wider range of production techniques than traditional grinding and polishing. In particular the excellent precision of 3D printing makes it possible to manufacture optical grade lenses in a quick and highly customizable way. Nevertheless the final production step of attaching the lenses to the frame is still necessary. To gain the full benefit of the effectiveness of 3D printing, the challenge is to print as many parts of the eyewear together and thereby streamline the production process. The ultimate goal is to manufacture complete eyewear items in one piece in a simple and economic manner.

One-piece eyewear items are known in the prior art. For example US 2009/0323016 A1 discusses a method of manufacturing spectacles of the single-lens, wrap-around type. US 2014/0160423 A1 discloses an integrally molded apparatus for headwear and wrap eyewear and EP 2980629 A1 describes eyeglasses with built-in lenses and a method for manufacturing such eyeglasses.

SUMMARY

It is an object of the present invention to provide a method for effective and economical manufacturing of corrective eyewear through optimized alignment between the shape design of the eyewear product and the associated manufacturing process.

The object of the present invention is achieved by a method for manufacturing one-piece corrective eyewear, the method comprising a first step wherein an item with essentially flat blank shape encompassing two lens portions, a bridge portion and two temple portions is formed by a 3D-printing process, the method further comprising a second step wherein the item is deformed into a wearable shape.

The object of the present invention is furthermore also achieved by a method for manufacturing one-piece corrective eyewear, the method comprising a first step wherein an item with essentially flat blank shape encompassing
two lens portions, a bridge portion and two temple portions,
or
two lens portions and a bridge portion
is formed by a 3D-printing process, the method further comprising a second step wherein the item is deformed into a wearable shape.

According to the invention the blank shape of the eyewear item is designed in such a way that it can be 3D-printed in a quick and uncomplicated fashion and then be brought into a wearable configuration by a very simple deformation process. To achieve such an advantageous interplay between shape and process, the blank shape is essentially flat. To facilitate a precise description of the spatial configurations of the eyewear, the following terminology is introduced that ties this spatial configuration to the orientation of a human face in an upright position: In reference to the anatomical frontal plane, i.e. the plane that bisects the human body between back and front, the term "frontal plane" of the eyewear denotes the plane that lies essentially parallel to the human face and contains both midpoints of the two lenses. The frontal plane is spanned by a horizontal axis (i.e. between left and right) and a vertical axis (i.e. between bottom and top) and is basically orthogonal to the line of sight of the person wearing the eyewear. The two sides of the eyewear that face inward (pointing towards the face) and outward (pointing away from the face) are denoted as back and front side respectively. The front side constitutes the base from which the 3D-printing process starts, typically on some kind of substrate on which material is deposited. The printing process proceeds by successive accumulation of further material on top of already deposited material, thereby building the shape of the item from the base up.

According to the invention the lens portions, bridge portion and two temple portions are printed in one piece as parts of an integral, continuous shape.

According to an alternative embodiment of the present invention, the method comprises, in the first step, providing an item with essentially flat blank shape and encompassing only two lens portions and a bridge portion (i.e. the item might be provided, in the first step, without the temple portions, or, worded otherwise, according to this alternative embodiment of the present invention, the lens portions and the bridge portion are printed in one piece as parts of an integral, continuous shape).

It is possible to change between different materials during the printing process, e.g. using transparent material for the lens portions and opaque material for bridge and temple portions or even using materials of different refractive index for different regions of the lens portions. Alternatively the whole blank shape can be printed using a transparent or tinted material. The printing stops when the desired shape is created, with the last deposited layer forming the back side of the item or the highest point or points on the back side of the item. It is therefore natural to refer to the height of the material accumulated at each point (measured from the front side up) as the height profile of the printed shape. The term "maximal extension" denotes the distance between the lowest point of the front side and the highest point of the back side. It is to be noted that the terms "height profile" and "maximal extension" are only used to describe the item before bending, i.e. regarding the blank shape of the eyewear.

In order to achieve a seamless and fast printing process the blank shape is essentially flat. In the context of the present invention "essentially flat" involves one or more of the following characteristics: One possible aspect is the property that the maximal extension of the blank shape is significantly smaller than the dimensions of the item in any other direction. Another possible aspect is that in absolute terms the maximal extension is less than 4 cm, preferably less than 2 cm and particularly preferred less than 1 cm. Yet another possible aspect is the front side of the blank shape being planar, mostly planar or only slightly curved and the height profile providing only as much thickness as mechanical stability of the eyewear and the optical properties of the lenses demand (e.g. not more than 2 cm, preferably less than 1 cm). In a preferred embodiment of the inventive method "essentially flat" includes the property that the front face of the shape is of single-curvature, i.e. the surface at the front side is curved only in one direction. Geometrically speaking this means that one of the principal curvatures is zero (and so is the Gaussian curvature of the surface). The main consequence of the blank shape being essentially flat is that the number of material layers which have to be added during the printing process is advantageously low, i.e. the dimensions of the blank shape in the printing direction (i.e. the direction in which the shape grows by depositing material) is rather small so that the printing can be accomplished in a quick and relatively uniform manner without having strongly modulated or protruding parts of the shape which would make the addition of many layers necessary.

The data input for the 3D-printing process consists primarily of a 3D model which serves as a blueprint of the blank shape to be printed. Apart from aesthetic considerations the blank shape as a whole has to satisfy the requirements of mechanical stability and the shape of the lens portions is subject to the condition that the desired optical power is attained. The generation of the blank shape for a given prescription can be automated and even directly coupled to a diagnostic apparatus that determines said prescription data. The 3D-model can e.g. be generated by choosing a suitable family of shapes that contains a sufficiently large number of degrees of freedom or adjustable parameters to realize the necessary range of optical correction. This approach advantageously facilitates a high degree of customizability since the shape can be flexibly adjusted to individual needs.

It is furthermore preferred that the optical properties of the lenses are mainly obtained by a modulation of the back side of the lens portion. Preferably, the front side of the lens portion is unmodulated, i.e. it is either planar or curved only in the horizontal direction and straight in the vertical direction (i.e. a single-curvature surface with vanishing curvature in the vertical direction). This means that the surface at the front side of the blank shape (i.e. including, at least, the lens portions and the bridge, i.e. the front side of, at least, the two lens portions and the bridge portion) is either planar or is curved only in the horizontal direction and straight in the vertical direction. This provides the possibility that, advantageously, the mechanical stress is distributed more uniformly over the front side when the eyewear is bent.

The optical properties of the lenses are obtained by choosing the profile of the printed shape according to the desired optical power. Since the shape of the lens portion becomes distorted during the bending in the second step, this distortion can be taken into account before-hand. Therefore, the deformational response of the blank shape to compressional and tensile stresses is calculated in advance and the height profile is adjusted to accommodate the corresponding deformation. This compensational adjustment can be automated as part of the generating algorithm for the 3D model of the blank shape.

The final shape (rest shape) of the eyewear is produced by bending the essentially flat blank shape into a wearable configuration. According to a preferred embodiment of the invention, the deformation in the second step is performed by bending the temple portions towards each other and/or by bending the eyewear item until the temple portions point essentially in the same direction or in slightly converging directions and/or by bending the eyewear item uniformly over the whole shape, wherein especially this bending is provided or executed in a controlled manner in order to achieve a predetermined rest shape. Preferably, the two temple portions are bent towards each other until they are aligned essentially orthogonal to the frontal plane. In this context bending refers to a plastic deformation which results in a permanent change of the shape. Since the printed item usually has considerable flexibility, it can be advantageous to bend the eyewear item into a rest shape where the temples point in slightly converging directions so that they have to be (elastically) bent apart to put them on. In this way the flexibility of the eyewear provides a secure fit for the head of the person wearing it. It is also possible to perform the bending in a rather uniform manner, i.e. applying uniform stress along the whole shape of the eyewear item, resulting in a rest shape that is essentially round or uniformly curved. The flexibility of the eyewear can be utilized in yet another way by bending the shape into a compact shape for storing it, e.g. in a retainer or in an eyewear case. To this end the temples are elastically bent towards each other, so that the eyewear as a whole occupies only minimal space relative to the rest shape. Apart from plastically bending the temples in the second step, additional plastic deformation can be performed to transform the blank shape into a wearable shape that maximizes the field of vision of the wearer and allows a maximally comfortable fit. The bending can be carried out by any mechanical means, either manually or by transferring the item into a separate bending device. In a particularly preferred embodiment both printing and bending are performed fully automated in an integrated device having both capabilities.

In the alternative that the inventive method is conducted such that, after the first step, the item formed does only encompass two lens portions and a bridge portion (i.e. it does not encompass temple portions), the item is deformed, in the second step, by bending the eyewear item uniformly and especially in a controlled manner over the whole shape, i.e. typically applying stress along the whole shape of the eyewear item, resulting in a predetermined rest shape that is essentially round or curved.

It is to be understood that, according to all possible embodiments or variants of the present invention, the rest shape of the deformed item or the resulting eyewear product corresponds to a predetermined form or shape which is able to be—according to one alternative bending variant—round or uniformly curved (implying a rather constant bending radius or curvature along the horizontal extension of the eyewear product) but which is also able to be—according to other alternative bending variants—different from "round" or "uniformly curved" (in the sense of a constant bending radius or curvature along the horizontal extension of the eyewear product), i.e. the predetermined form or shape means that the bending radius is able to vary along the horizontal extension of the eyewear product in a predetermined (or controlled) manner, e.g. the bending radius could be (comparatively) higher in the middle part and towards both ends of the eyewear product, and it could be (comparatively) lower in a portion (preferably symmetrically on both sides or "halves" of the eyewear product) between the middle part and both ends of the eyewear product.

According to a preferred embodiment of the present invention, during the first step a nose pad portion is formed as part of the blank shape or wherein the method further comprises a third step, subsequent to the second step, wherein a nose pad is attached to the item. The nose pad can either be formed during the printing process as an integral part of the blank shape or subsequently attached to the eyewear. The nose pad portion can be formed in a single, continuous region of the blank shape or in two separate regions. Forming the nose pad portion during printing keeps the number of operational steps advantageously low and leads to a simplified process flow. Attaching the nose pad in a separate step has the advantage that the printed blank shape is simplified and the printing process therefore less time consuming. Regarding the separate attachment step it is preferred that the nose pad and the eyewear shapes are sufficiently modular, i.e. that the available range of nose pad shapes and eyewear shapes is maximally compatible to allow as many combinations as possible. In an alternative embodiment the third step can be performed with two nose pads.

According to a preferred embodiment of the present invention, during the first step two hinge portions connecting the lens portions and temple portions are formed as part of the blank shape. To achieve a high degree of adjustability it is advantageous to provide hinge portions that make it possible to bend or fold the temples of the eyewear towards the frontal plane. This can be accomplished by printing the hinge portions in a shape that facilitates elastic deformability, e.g. an undulated shape that mimics the mechanism of a mechanical spring or in the form of tape spring hinges or simply by printing the hinge portions with a reduced cross section. In an alternative embodiment of the invention the hinge portions are printed with a different, flexible material, i.e. using a highly elastic material for those portions during the printing process.

According to a preferred embodiment of the present invention, during the first step a frame portion surrounding the lens portions is formed as part of the blank shape. In the minimal version of the inventive manufacturing method, the blank shape comprises only the quintessential elements of an eyewear item, i.e. lenses, bridge and temples. For aesthetic and/or structural reasons this principal structure can be augmented by joining these elements with a frame portion, either completely or partially surrounding the lens portions. The frame portion can be constructed in such a way that mechanical stability is improved. Additionally the frame portion can be utilized in a crucial way in the generation of the 3D model (preferably realized as part of a computational algorithm). The shape of the lens portions is to a large degree dictated by optical requirements and can for example be constructed by defining a universal shape of the front surface (preferably flat or of single-curvature) and constructing the back surface by calculations based on optical principles. The resulting two surfaces have to be joined with a predefined bridge portion and temple portions and completed in such a way that a closed surface is generated that can be used as a blueprint for the 3D-printing process. The frame portion can be used for closing the shape by providing another universal shape together with mathematical conditions on how to connect it to the shape elements of lens, bridge and temple portions. This can for example be accomplished by interpolating the remaining gaps in the surface in a certain way, for example by spline interpolation that provides surface parts that connect smoothly to the other shape elements.

According to a preferred embodiment of the present invention, during the first and second step the item is in a highly deformable state and the method comprises a fourth step, subsequent to the second step, wherein the item is rigidified. 3D-printing can be implemented by a variety of procedures well known to those skilled in the art. A common technique is the deposition of fluid droplets wherein after deposition the droplet is cured e.g. by UV light via photopolymerization. The inventive method is not limited to a particular technique and allows the following general embodiment: The printing process generically involves the transformation of a highly plastic state of the item or parts of the item into a solid state and might include any range of intermediate states between them. The transformation might involve curing, drying, heating, cooling or chemical treatment. For processes in which the printing can be performed in such a way that it leaves the item in an at least partially plastic state, the inventive method allows performing the bending of the blank shape in this plastic state and transformation into the solid state is performed only after the wearable shape of the eyewear is obtained. Another possibility is to leave only parts of the item in a plastic state, preferably those parts that are deformed in the bending process and transform them into the solid state after the bending step.

According to a preferred embodiment of the present invention the 3D-printing process is conducted by depositing fluid droplets on a print bed or a carrier film, wherein the print bed or carrier film is flat or of single-curvature. Surfaces of single-curvature are developable, i.e. they can be flattened into a plane without distortion (like stretching or compression). Conversely a flat surface can be bent into a single-curvature configuration without such distortions taking place. This feature makes the use of a single-curvature substrate (print bed or carrier film) a highly advantageous embodiment of the inventive method. Printing on a single-curvature substrate results in a single-curvature front side of the blank shape which means that during the subsequent bending step the deformation of the front surface does not develop any internal distortion. Of course this is strictly true only for an ideal surface, since for a realistic shape of finite dimensions the material behind the front surface introduces additional stresses during the bending process that may also affect the front surface. Nevertheless, as long as the single-curvature front face acts as a structural backbone, distortions during bending are minimized so that the deformation can be advantageously performed without an unnecessary amount of tensile or compressional distortions of the shape. In embodiments in which a carrier film is used as a substrate, this geometric configuration has the advantage that any planar carrier film can be brought into a non-planar but singly-curved shape by simply bending the planar carrier film. The carrier film can either serve as a substrate that is removed after printing or after the wearable shape is obtained or it can remain an integral part of the eyewear shape, advantageously serving as an almost distortion-free structural backbone.

According to a preferred embodiment of the present invention the lens portions of the item are printed with tinted material or wherein the method comprises a fifth step subsequent to the first step, wherein the lens portions are colored or tinted and/or covered with a protective and/or anti-reflective layer. This allows a greater flexibility for designing the visual appearance of the eyewear item. Additionally, the lenses can be tinted and/or coated to provide a protective filtering function against the ultraviolet range of the sunlight spectrum. The coating can also function as a protective layer against mechanical scratches. In a preferred embodiment the coloring and/or coating is performed in the same device which carries out the printing and bending steps.

According to a preferred embodiment of the present invention the bridge portion and/or the temple portions and/or the nose pad portion and/or the hinge portion and/or the frame portion are printed with an opaque or colored material. The technical possibility of switching between different materials or differently colored materials during the printing process allows to print an eyewear item with highly tailored properties of the different portions. In a preferred embodiment the bridge portion (3) and/or the temple portions (4) are printed with a flexible material. By having a relatively rigid lens portion and highly elastic bridge and temple portions the flexibility of the eyewear as a whole is advantageously increased and at the same time mechanical deformations of the lens portion that could compromise the optical properties are avoided.

According to a preferred embodiment of the present invention the method comprises a sixth step wherein the bridge portion and/or the temple portions and/or the nose pad portion and/or the hinge portion and/or the frame portion are colored and/or covered with a protective and/or decorative layer.

Another object of the present invention is an eyewear item manufactured with the inventive method. Another object of the present invention is the use of such an eyewear item, wherein the eyewear item is elastically deformed into a storage shape and the elastically deformed eyewear item is stored in a retainer or eyewear case.

DETAILED DESCRIPTION

Figure 1:
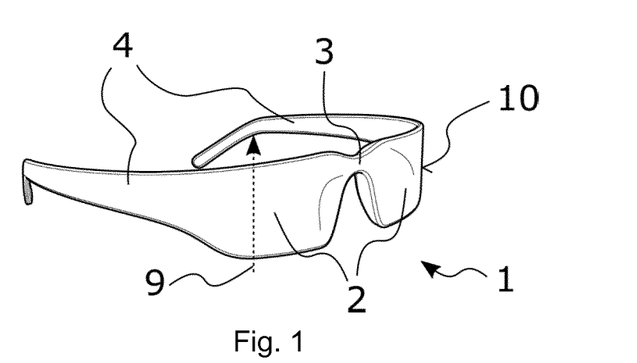
FIG. 1 shows a one-piece corrective eyewear item manufactured according to an embodiment of the inventive method.

FIG. 1 illustrates the general shape and different portions of the eyewear 1 manufactured according the method of the present invention. The eyewear item 1 is in its final, wearable configuration after the manufacturing process is finished. The eyewear item 1 consists of a single, connected and continuous piece that is printed with a transparent material in the first manufacturing step and bent into the wearable configuration during the second manufacturing step. The front side 10 of the item 1 is smooth and unstructured with the surface having vanishing curvature in the vertical direction. The eyewear item 1 comprises two lens portions 2 whose thickness varies in such a way that the desired optical properties (the corrective power of the lens portions) are achieved. In this embodiment the varying thickness is realized by an unmodulated front face 10, a modulation being present exclusively on the opposing face. The one-piece eyewear further comprises two temple portions 4 and a bridge portion 3 that connects the two lens portions 2.

Figure 2:
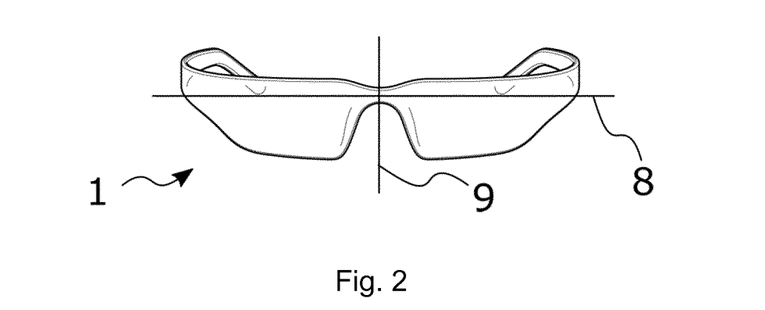
FIG. 2 shows a frontal view of a one-piece corrective eyewear item manufactured according to an embodiment of the inventive method.

FIG. 2 illustrates the horizontal axis 8 and the vertical axis 9, the two reference axes used for describing the geometrical configuration of the eyewear item 1.

Figure 3A:
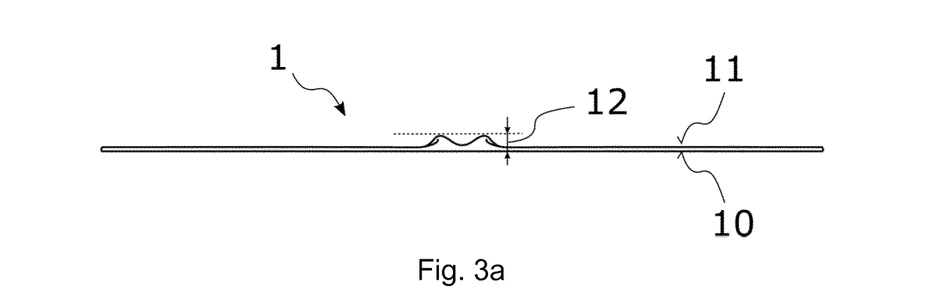
FIG. 3a shows a side view of a blank shape manufactured according to the first step of an embodiment of the inventive method.

FIG. 3a shows a side view of a blank shape printed in the first step of an embodiment of the inventive method. The printing process starts by depositing a first layer of transparent material on a substrate and proceeds by successively depositing multiple layers on top of each other. In the embodiment depicted here, the substrate (not shown) is entirely planar and so is the first printed layer forming the front face 10 of the blank shape. The varying thickness necessary for providing the optical properties of the eyewear item 1 results in a modulation of the back face 11. Since the local thickness of the item corresponds directly to the number of deposited layers, it is favorable to print a shape that is essentially flat. In this embodiment the flatness of the shape can be quantified by the maximal extension 12 of the profile. In the second step of the inventive method this flat shape is brought into a wearable form by bending it into a configuration similar to that of FIG. 1.

Figure 3B:
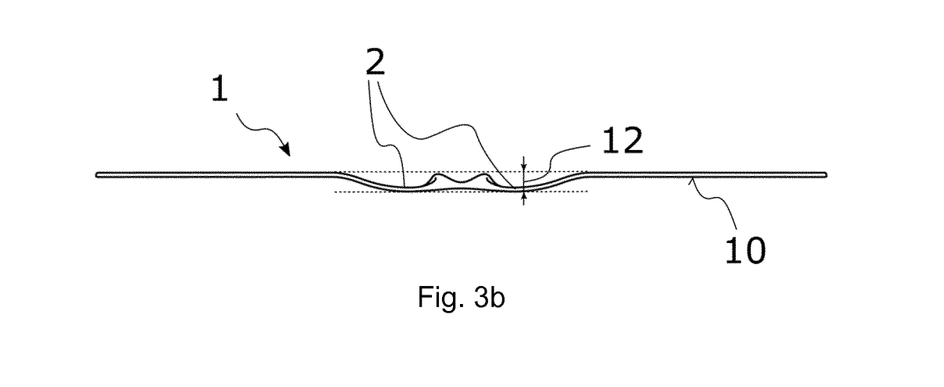
FIG. 3b shows a side view of a blank shape manufactured according to the first step of an embodiment of the inventive method.

FIG. 3b shows a similar side view of a blank shape resulting from the printing process. In this embodiment the front side 10 is not entirely planar but contains a curved region around the middle part that creates a curved shape of the front side of the lens portions 2. As indicated in the figure the maximal extension 12 is again rather small and the blank shape essentially flat.

Figure 4:
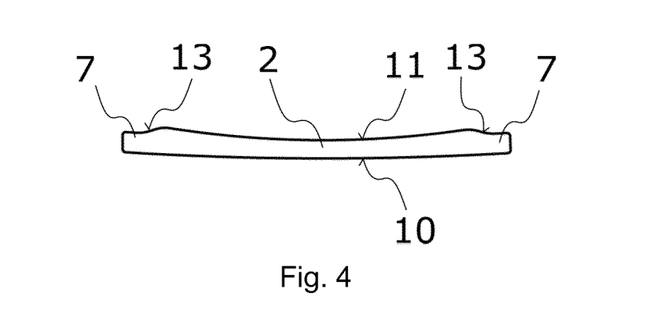
FIG. 4 shows schematically the shape of the lens portion of a blank shape manufactured according to the first step of an embodiment of the inventive method.

FIG. 4 illustrates a possible construction of a 3D model for the blank shape. Depicted here is a section of the shape containing a lens portion 2 and parts of the frame portion 7. The construction starts from a predefined front side 10 of the lens portion 2 and an outer rim formed by the frame portion 7. The shape of the outer rim 7 is chosen in such a way that it can be smoothly joined to the front side 10 of the lens portion 2. The resulting surface element constitutes the basis for all subsequent geometrical steps. The back side 11 of the lens portion 2 is constructed based on the desired optical properties of the lens portion 2, i.e. the local thickness between front face 10 and back face 11 is constructed by using optical principles. For generating a closed surface that can be used as a blueprint to be realized as a solid three-dimensional shape, the remaining gaps between the surface elements of the frame portions 7 and the back side 11 of the lens portions 2 have to be closed. This can be achieved by connecting the frame portion surface 7 with additional surface elements that form a seam area 13 providing a smooth transition between frame portions 7 and lens portions 2. Constructing such surface elements corresponds to a geometric interpolation between two surfaces (frame 7 and lenses 2) and can for example be performed by piecewise polynomial interpolation or any other method that gives robust (and preferably aesthetically pleasing) results.

FIG. 5 illustrates an embodiment of an eyewear item 1 printed with the inventive method in several configurations. FIG. 5a depicts the essentially flat blank shape where the temples 4 are lying basically parallel to the frontal plane.

Figure 5A:
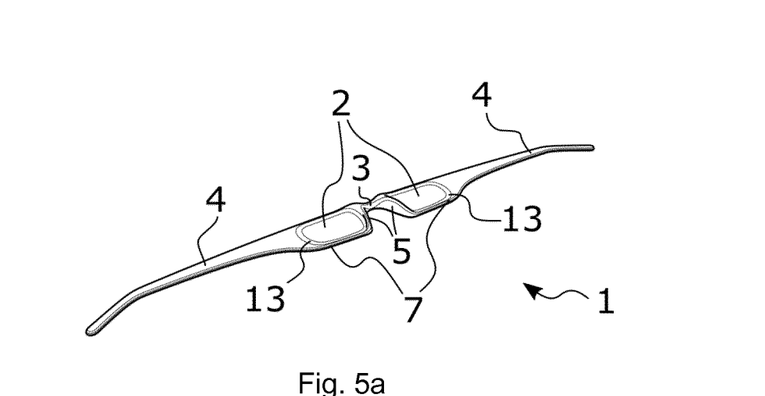
FIGS. 5a-5d show several configurations of an eyewear item manufactured according the inventive method.
Figure 5B:
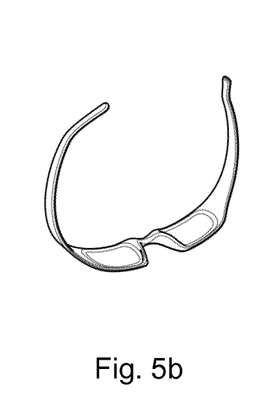
Figure 5C:
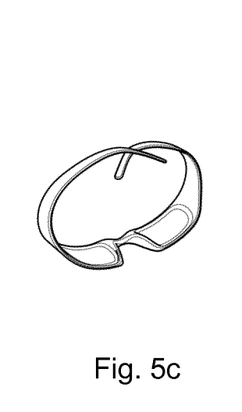
Figure 5D:
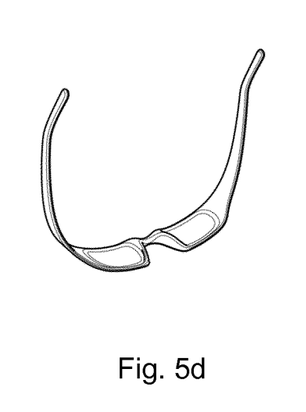
Figure 6A:
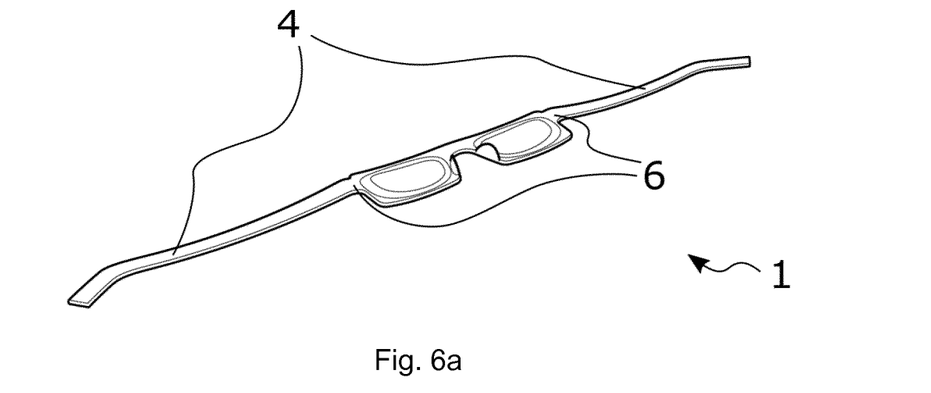
FIGS. 6a-6d show several configurations of an eyewear item manufactured according the inventive method.
Figure 6B:
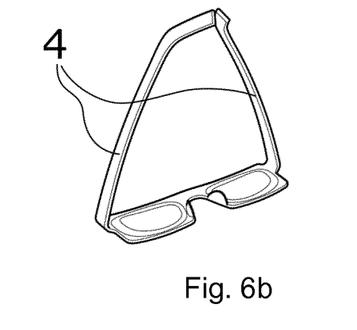
Figure 6C:
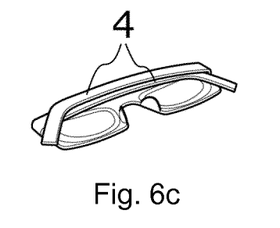
Figure 6D:
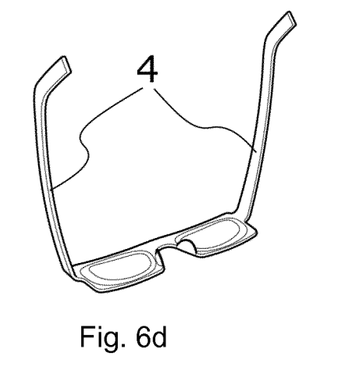

This is the initial shape that is produced during the 3D printing step of the inventive method. In this embodiment the eyewear item 1 comprises two lens portions 2 surrounded by a frame portion 7 which continuously merges with a bridge portion 3, two nose pad portions 5, a bridge portion 3 and two temple portions 4. In order to provide a smooth transition between frame 7 and lenses 2, the shape comprises two seam areas 13 that connect those portions according to the construction described in FIG. 4, resulting in an integral shape without gaps or abrupt transitions. After printing the flat blank shape in one piece, the final shape is created by plastically bending the temples 4 towards each other. In this embodiment the bending is performed rather uniformly over the whole shape, resulting in the almost round rest shape in FIG. 5*b*. The rest shape can be elastically deformed into the storage configuration shown in FIG. 5*c* or into the wearable configuration in FIG. 5*d*.

FIG. 6 illustrates several configurations of another embodiment of the eyewear item 1 printed with the inventive method. FIG. 6*a* shows the essential flat blank shape after the item is printed in the first step. In the second step the temples 4 are bent towards each other. In the depicted embodiment this deformation is performed by mainly bending only the hinge portions 6. The resulting rest shape in FIG. 6*b* (i.e. the final shape after the bending) is arranged in such a way that the temple portions 4 point in directions that are oriented almost orthogonal relative to the frontal plane but are slightly tilted towards each other. In order to put them on, the temples 4 have to be (elastically) bent apart, as depicted in FIG. 6*d*. This has the advantage that the temples 4 press slightly against the head, offering a secure fit. To facilitate these elastic deformations, the hinge portions 6 are printed with material that is more elastic than the rest of the eyewear item. This also allows to put the eyewear item 1 into a storage configuration (depicted in FIG. 6*c*), where the temples 4 are folded against the main body of the eyewear item 1.

Figure 7:
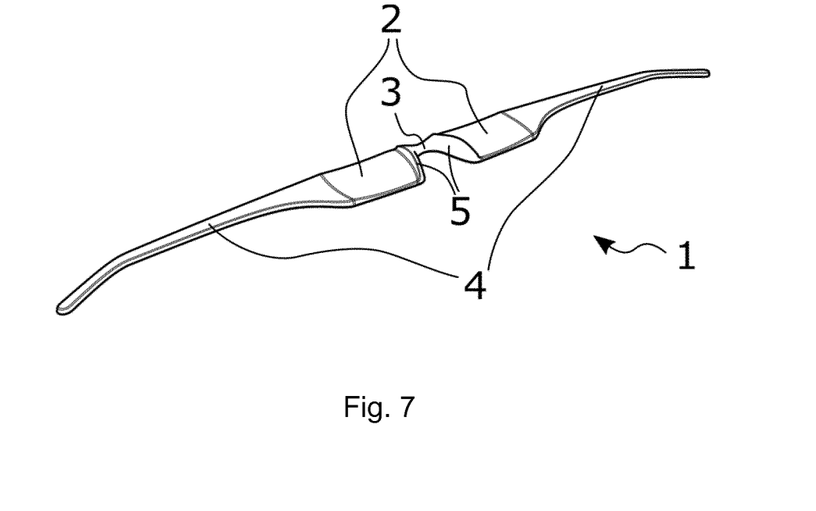
FIG. 7 shows a blank shape manufactured according to the first step of an embodiment of the inventive method.

FIG. 7 illustrates a blank shape manufactured according to the first step of an embodiment of the inventive method. In this embodiment the eyewear item 1 is formed without a frame portion. The blank shape comprises only the lens portions 2, the bridge portion 3, the nose pad portion 5 and the temple portions 4. The nose pad portion 5 is formed as an integral part of the bridge portion 3 and the blank shape.

Figure 8:
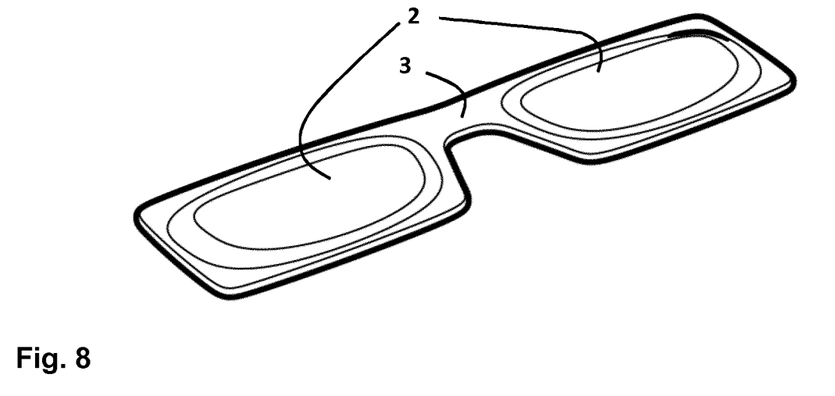
FIGS. 8 and 9 show an example of the one-piece corrective eyewear (the blank shape item in FIG. 8, and the one-piece corrective eyewear product in FIG. 9), where the blank shape item only comprises two lens portions and a bridge portions, i.e. without temple portions.
Figure 9:
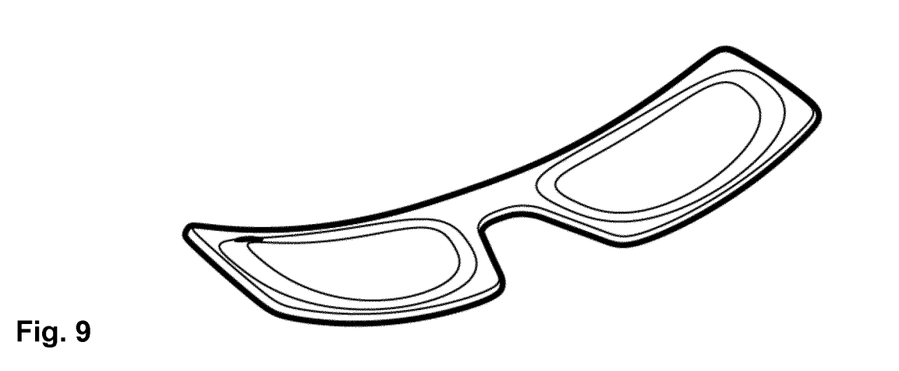
Figure 10:
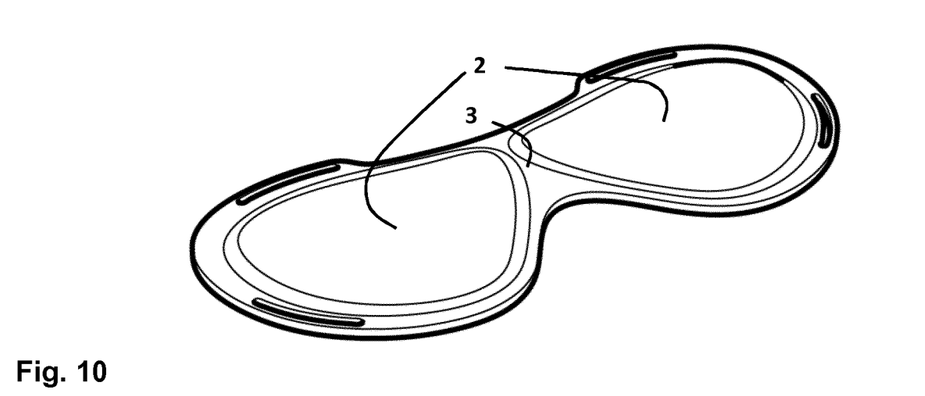
FIGS. 10 and 11 show a further example of the one-piece corrective eyewear (the blank shape item in FIG. 10, and the one-piece corrective eyewear product in FIG. 11), where the blank shape item only comprises two lens portions and a bridge portions, i.e. without temple portions.
Figure 11:
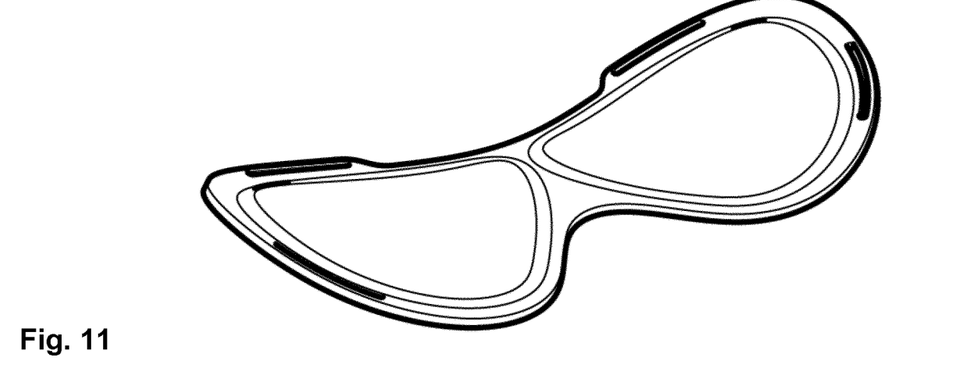
Figure 12:
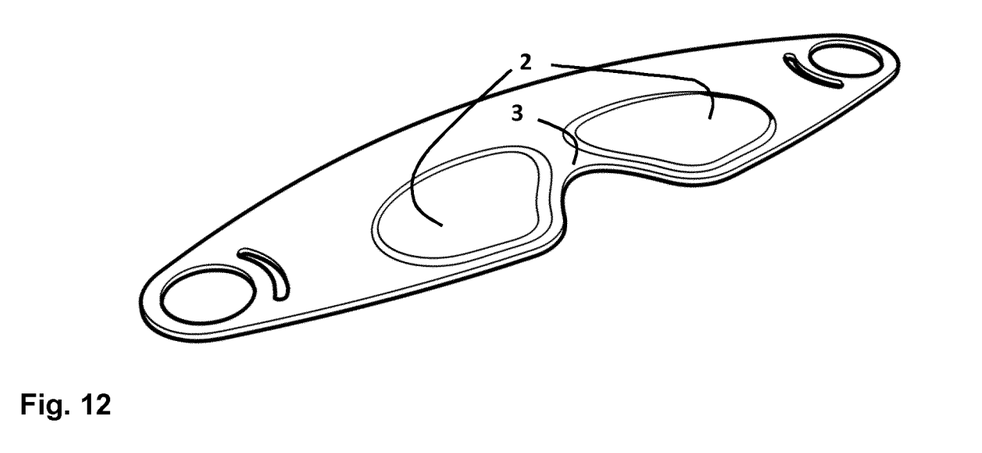
FIGS. 12 and 13 show an example of the one-piece corrective eyewear (the blank shape item in FIG. 12, and the one-piece corrective eyewear product in FIG. 13), where the blank shape item only comprises two lens portions and a bridge portions, i.e. without temple portions.

FIGS. 8 to 13 show further examples of one-piece eyewear or one-piece eyewear products, wherein the one-piece eyewear products exemplarily shown in FIGS. 8 to 13 comprise two lens portions and a bridge portion (instead of two lens portions, a bridge portion and two temple portions; i.e. they are lacking the temple portions). In FIGS. 8, 10, and 12, the respective flat blank shapes or blank shape items are shown, whereas in FIGS. 9, 11, and 13, the respective wearable shapes of three different one-piece eyewear products are shown. Typically, these one-piece eyewear products will have to be attached to separate temple portions or separate wearable objects like a goggle frame, a helmet, a diving mask frame or some other wearable object or device.

Figure 13:
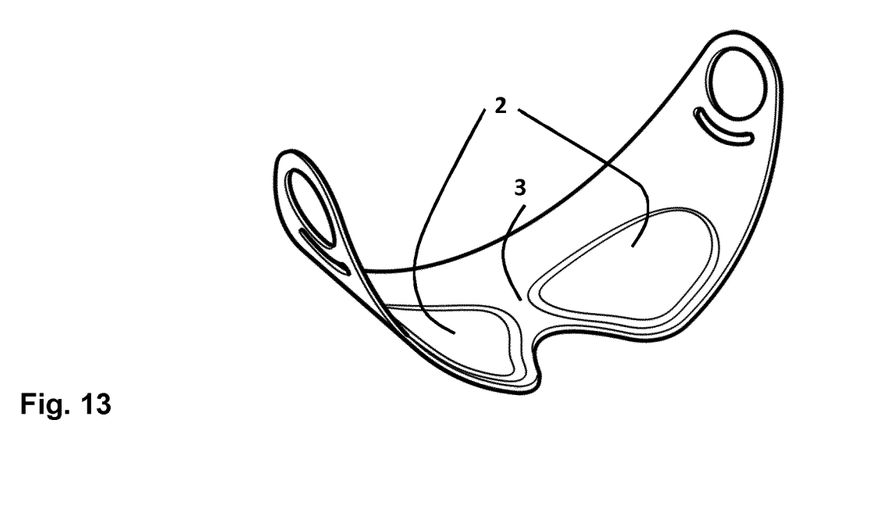

FIGS. 8 and 9 show a general example of such a one-piece corrective eyewear (the blank shape item in FIG. 8, and the one-piece corrective eyewear product in FIG. 9), where the blank shape item only comprises two lens portions and a bridge portions, i.e. without temple portions. Likewise, FIGS. 10 and 11 show a further example of the one-piece corrective eyewear (the blank shape item in FIG. 10, and the one-piece corrective eyewear product in FIG. 11) as a goggle, especially skiing goggle lenses, and FIGS. 12 and 13 show still a further example of the one-piece corrective eyewear (the blank shape item in FIG. 12, and the one-piece corrective eyewear product in FIG. 13) as a visor.

The invention claimed is:

1. A method for manufacturing one-piece corrective eyewear, the method comprising:
   a first step comprising forming an item with an essentially flat blank shape by a 3D-printing process, the item comprising: two lens portions, a bridge portion, and two temple portions; or the item comprising: the two lens portions and the bridge portion; and
   a second step following the first step, wherein the second step comprises deforming the item into a wearable shape, the deforming is performed by plastically deforming the item by applying uniform stress along an entire shape of the item;
   wherein during the first step, a frame portion surrounding the two lens portions is formed as part of the blank shape;
   wherein during the first step, a front side of the two lens portions is planar or curved only in a horizontal direction and straight in a vertical direction;
   wherein during the first step and the second step, the item is in a highly deformable state, and
   wherein the method comprises a step subsequent to the second step where the item is rigidified.

2. The method according to claim 1, wherein the deforming in the second step is performed by bending the two temple portions towards each other and/or by bending the item until the two temple portions point essentially in the same direction or in slightly converging directions.

3. The method according to claim 1, wherein during the first step a nose pad portion is formed as part of the blank shape or wherein the method further comprises a third step, subsequent to the second step, wherein the nose pad portion is attached to the item.

4. The method according to claim 1, wherein during the first step two hinge portions connecting the two lens portions and the respective two temple portions are formed as part of the blank shape.

5. The method according to claim 4, wherein the two hinge portions are printed with a different, flexible material than other portions of the corrective eyewear.

6. The method according to claim 1, wherein the 3D-printing process is conducted by depositing fluid droplets on a print bed or a carrier film, wherein the print bed or the carrier film is flat or of single-curvature.

7. The method according to claim 1, wherein the two lens portions are printed with tinted material or wherein the method comprises a step subsequent to the first step, wherein the two lens portions are colored or tinted and/or covered with a protective and/or anti-reflective layer.

8. The method according to claim 1, wherein the bridge portion and/or the two temple portions and/or a nose pad portion and/or a hinge portion and/or the frame portion are printed with a tinted, opaque or colored material.

9. The method according to claim 1, wherein the bridge portion and/or the two temple portions are printed with a flexible material.

10. The method according to claim 1, wherein the method comprises a step wherein the bridge portion and/or the two temple portions and/or a nose pad portion and/or a hinge portion and/or the frame portion are tinted or colored and/or covered with a protective and/or decorative layer.

* * * * *